United States Patent
Patel et al.

(10) Patent No.: US 9,525,726 B2
(45) Date of Patent: Dec. 20, 2016

(54) COMPUTE FOLLOWED BY NETWORK LOAD BALANCING PROCEDURE FOR EMBEDDING CLOUD SERVICES IN SOFTWARE-DEFINED FLEXIBLE-GRID OPTICAL TRANSPORT NETWORKS

(71) Applicant: NEC Laboratories America, Inc., Princeton, NJ (US)

(72) Inventors: Ankitkumar Patel, Plainsboro, NJ (US); Philip Ji, Cranbury, NJ (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 177 days.

(21) Appl. No.: 14/312,603

(22) Filed: Jun. 23, 2014

(65) Prior Publication Data

US 2014/0379926 A1    Dec. 25, 2014

Related U.S. Application Data

(60) Provisional application No. 61/838,462, filed on Jun. 24, 2013.

(51) Int. Cl.
*G06F 15/173* (2006.01)
*H04L 29/08* (2006.01)
*H04Q 11/00* (2006.01)
*H04L 12/803* (2013.01)

(52) U.S. Cl.
CPC ......... *H04L 67/1002* (2013.01); *H04L 47/125* (2013.01); *H04Q 11/0001* (2013.01)

(58) Field of Classification Search
None
See application file for complete search history.

(56) References Cited

U.S. PATENT DOCUMENTS

| | | | | |
|---|---|---|---|---|
| 2014/0098673 A1* | 4/2014 | Lee | ......... | H04L 45/64 370/238 |
| 2014/0099119 A1* | 4/2014 | Wei | ......... | H04J 14/0257 398/79 |
| 2014/0307556 A1* | 10/2014 | Zhang | ......... | H04L 45/42 370/236 |

* cited by examiner

*Primary Examiner* — John B Walsh
(74) *Attorney, Agent, or Firm* — Joseph Kolodka

(57) ABSTRACT

A method entails an efficient procedure, namely Compute followed by Network Load Balancing (CNLB), that first maps virtual nodes over physical nodes while balancing computational resources of different types, and finally, maps virtual links over physical routes while balancing network spectral resources.

9 Claims, 3 Drawing Sheets

COMPUTE FOLLOWED BY NETWORK LOAD BALANCING PROCEDURE FOR EMBEDDING CLOUD SERVICES IN SOFTWARE-DEFINED FLEXIBLE-GRID OPTICAL TRANSPORT NETWORKS

RELATED APPLICATION INFORMATION

This application claims priority to provisional application No. 61/838,462 filed Jun. 24, 2013, the contents thereof are incorporated herein by reference, This application is related to co-pending U.S. patent application Ser. No. 14/312,610, entitled "Network Followed by Compute Load Balancing Procedure for Embedding Cloud Services in Software-Defined Flexible-Grid Optical Transport Networks", filed Jun. 23, 2014.

BACKGROUND OF THE INVENTION

The present invention relates generally to optical communications, and more particularly, to a compute followed by network load balancing procedure for embedding cloud services in software-defined flexible-grid optical transport networks.

Software-Defined Network (SDN) architecture enables network programmability to support multi-vendor, multi-technology, multi-layer communications, and to offer an infrastructure as a service. Recently, efforts are going on to integrate optical transport within IP/Ethernet-based SDN architecture to leverage optical transmission benefits, such as low interference, long reach, and high capacity transmission with lower power consumption. Such a network is referred to as Optical Transport SDN. Optical transport SDN can be realized by enabling flexibility and programmability in transmission and switching network elements, such as transponders and ROADMs, management of optical channels, such as flexible-grid channel mapping, and extracting control plane intelligence from the physical hardware to the centralized controller.

FIG. 1 shows architecture for optical transport SDN in which control plane is abstracted from physical hardware of network elements and most network control and management intelligence now resides into a centralized controller. The centralized controller controls network elements using a standardized protocol, such as OpenFlow over standardized interfaces at controller and network elements. The control plane decisions present in the form of rules, actions, and policies, and network elements applies these decision based on match-action on connections. Thus, optical transport SDN partitions a network into software defined optics (SDO) and optics defined controller (ODC).

Software-defined optics consists of variable rate transponders, flexible-grid channel mapping, and colorless-directionless-contentionless-gridless (CDCG) ROADMs. Variable-rate transponder can be programmed for various modulation formats and FEC coding. Thus, transponders can offer variable transmission capacity for heterogeneous reach requirements. Flexible-grid channel mapping allows an assignment of flexible amount of spectrum to channels to achieve higher spectral efficiency by applying spectrum-efficient modulation formats and eliminating guard bands. CDCG-ROADM can be programmed to switch connections operating on any wavelength with any spectral requirement over any outgoing direction. Furthermore, connections can be added and dropped at a node without contentions. These hardware and their features establishes foundation of SDON optimization and customization capabilities.

Optics defining controller manages the network, and performs network optimization and customization to utilize flexibility of SDO. ODC functionalities are further extracted into network/compute hypervisor, operating system, network applications and database, and debugger and management planes. These planes are isolated by open standardized interfaces to allow simultaneous and rapid innovations at each layer independently. Various control plane functionalities, for example, cloud resource mapping, routing and resource allocation, protection and restoration, defragmentation, energy optimization, etc., are installed as applications and data base in the ODC. Network/compute hypervisor offers virtualization by providing isolation and sharing functions to a data plane as well as an abstract view of network and computing resources while hiding physical layer implementation details to a controller in order to optimize and simplify the network operations. Operating system offers a programmable platform for the execution of applications and hypervisors. Debugger and management plane offers access control and QoS management, while monitoring network performance, and performs fault isolation, localization, and recovery.

Recently, cloud services have gained a lot of interests since it supports applications by sharing resources within existing deployed infrastructure instead of building new ones from scratch. These days network applications are becoming more and more cloud centric, for example social networking applications, such as FaceBook, Twitter, and Google+, e-science applications, such as Large Hadron Collider, content applications, such as NetFlix, and search applications, such as Google and Baidu. Cloud applications are supported by interconnecting various computing, storage, software, and platform-oriented resources within data centers through networks. Each data center is built with the goal of optimizing the type of services offered, for example Google data center is built with the goal of efficient indexing of web pages and minimization of content search time, while Facebook data center is built to offer maximum storage for user contents and efficient management and linking of these contents within user's social group, Amazon EC2 data center is built to offer faster computing time. Thus, one data center may not provide all types of resource, and may not optimally meet all the requirements of a cloud application. In such scenarios, open challenges are how to map a cloud request among data centers offering heterogeneous resources, and how to establish network connectivity between data centers. The problem is referred to as cloud service embedding problem. In this invention, we investigate cloud service embedding problem over software-defined flexible grid transport SDN networks. The problem is formally defined as follow.

We are given a physical network topology G(N, L), where N represents a set of physical nodes (PNs) and L represents a set of physical links (PLs) interconnecting physical nodes. Each node offers different types resources, for example, 1, 2, 3, ..., n, and the number of offered resources $C_j^n$ for each type j is given in advance. A node also consists of CDCG-ROADMs and variable rate transponders. CDCG-ROADM offers switching of flex-grid optical connections while variable rate transponders offer a set of modulation formats M, where the spectral efficiency $Z_m$ bit/second/Hz and transmission reach $D_m$ Km of each modulation format m is also given. A fiber offers total T THz of spectrum. A cloud demand is defined as G'(V, E, C, L), where V is a set of virtual nodes (VNs), E is a set of virtual links (VLs) connecting virtual nodes, C is a set of requested resources $(C_i^1, C_i^2, \ldots, C_i^n)$ at each virtual node i, L is a set of requested line rate $l_{ij}$ between virtual nodes i and j. The arrival and departure distributions of cloud requests are given. The problem is how to map virtual nodes of a cloud demand over physical nodes (the virtual node embedding problem) and virtual links of a cloud demand over physical links (the virtual link embedding problem), such that the number of embedded cloud demands is maximized. Virtual link embedding problem consists of sub-problems such as how to route a virtual link over physical routes, how to assign a wavelength and allocate spectrum, and how to select a modulation format. It is assumed that a network does not support wavelength, spectrum, or modulation format conversion capability.

Cloud embedding mainly consists of virtual node embedding and virtual link embedding. Since physical node and link resources are shared among multiple could demands, an embedding procedure needs to ensure isolation of these resources while maintaining the resource capacity constraints. When mapping virtual nodes over physical nodes, a procedure needs to ensure that different virtual nodes cannot be mapped over the same physical node. When mapping virtual links over physical routes through optical channels in flex-grid transport SDN, a procedure needs to ensure the wavelength continuity, and spectral continuity, spectral conflict. The wavelength continuity constraint is defined as an allocation of spectrum at the same operating wavelength on all links along the route of an optical channel. The spectral continuity constraint is defined as an allocation of the same amount of spectrum on all links along the route of an optical channel. The spectral conflict constraint is defined as an allocation of non-overlapping spectrum to all channels routed through the same fiber. Furthermore, a procedure also needs to make sure that a selection of modulation format for a virtual link and its routing over the network should support at least the physical Euclidean distance between the physical nodes on which virtual nodes are mapped. The constraint is referred to as the reachability constraint.

Cloud service embedding consists of virtual node embedding and virtual link embedding sub-problems. If the virtual nodes are per-assigned to physical nodes, then the problem of just mapping virtual links over physical links is referred to as virtual network embedding problem. The virtual network embedding problems have been extensively solved for IP/Ethernet-based networks while ignoring optical transport.

However, there is a need for a procedure that quickly solves the cloud service embedding problem in a smaller time interval compared to known techniques.

BRIEF SUMMARY OF THE INVENTION

The present invention is directed to a method that includes implementing by a computer an embedding of cloud demands over a software defined flexible grid optical transport network, the implementing that includes arranging virtual nodes in the network in a descending order of a total number of required resources, mapping the virtual nodes over physical nodes while balancing a load for different types of resources, arranging virtual links in a descending order of estimated spectral resources, mapping virtual links over physical routes and selecting a modulation format for the virtual links while balancing the load over physical links, and assigning wavelength and spectrum to the virtual links.

In an alternative embodiment of the invention, a system includes implementation by a computer an embedding of cloud demands over a software defined flexible grid optical transport network, the implementing includes arranging virtual nodes in the network in a descending order of a total number of required resources, mapping the virtual nodes over physical nodes while balancing a load for different types of resources, arranging virtual links in a descending order of estimated spectral resources, mapping virtual links over physical routes and selecting a modulation format for the virtual links while balancing the load over physical links; and assigning wavelength and spectrum to the virtual links.

These and other advantages of the invention will be apparent to those of ordinary skill in the art by reference to the following detailed description and the accompanying drawings.

DETAILED DESCRIPTION

Figure 1:
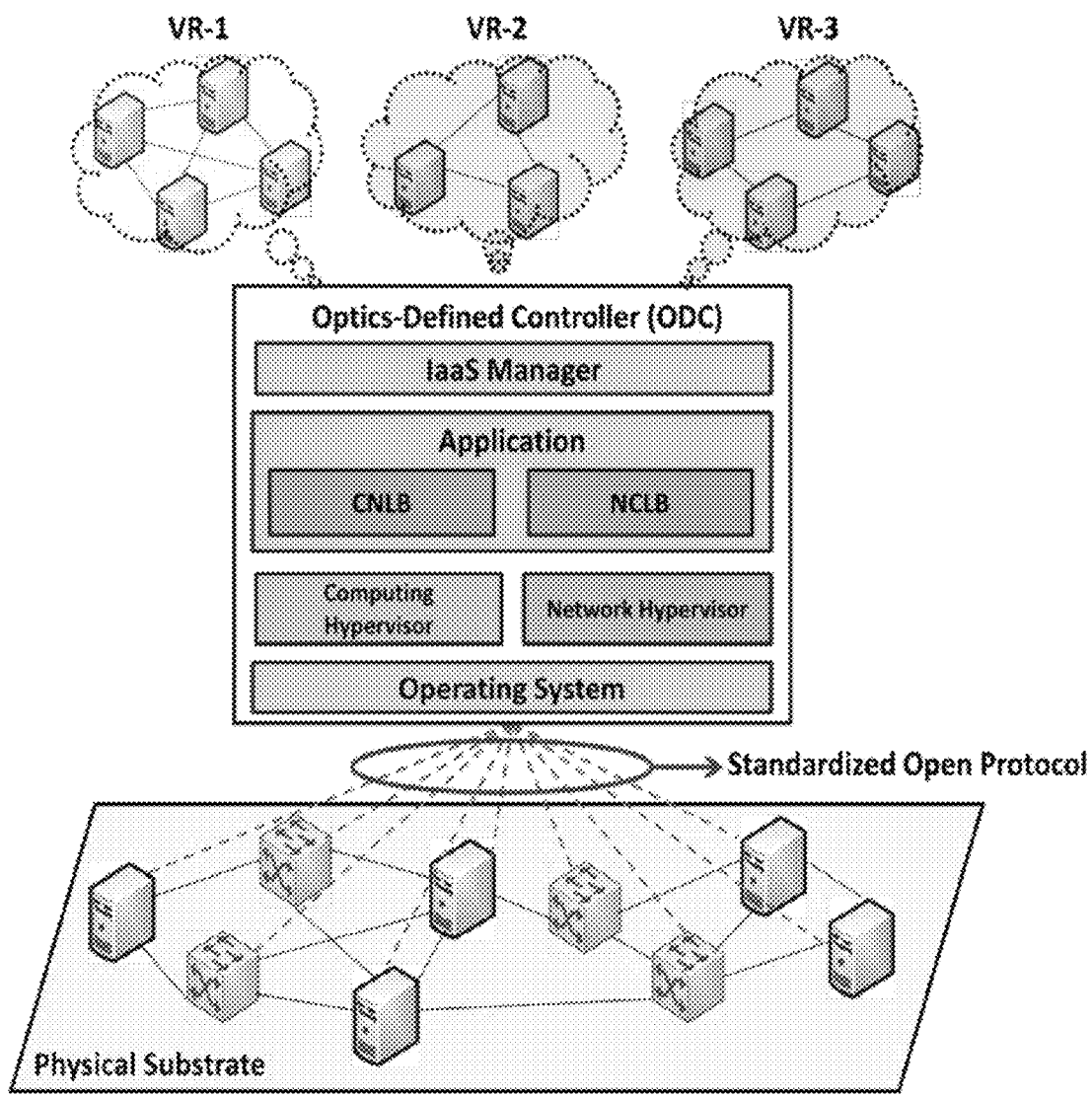
FIG. 1 is a diagram of an exemplary architecture of an optical transport software defined network SDN.

The present invention entails an efficient procedure, namely Compute followed by Network Load Balancing (CNLB), that first maps virtual nodes over physical nodes while balancing computational resources of different types, and finally, maps virtual links over physical routes while balancing network spectral resources.

To reduce the management complexity, the spectrum is slotted at the granularity of q GHz. A slot is referred to as a wavelength slot. Thus, spectrum can be represented by a set of consecutive wavelength slots, and among them, the first wavelength slot index is denoted as the wavelength of an optical channel. Thus, the network consists of total ceiling (T/q) wavelength slots [Note: ceiling(.) and floor(.) indicate ceiling and floor mathematical operations respectively over the value confined within a bracket]. The state of each wavelength slot is represented by a binary variable; '1' indicated that the wavelength slot is available and '0' indicates that the wavelength slot is occupied. The spectrum state of a fiber is represented by a binary vector that is referred to as a bit-map of a fiber.

The procedure pre-calculates up to k-shortest routes between each pair of nodes, where k≤|N|. The procedure first maps virtual nodes (VNs) over physical nodes (PNs) while performing load balancing over node resources. VNs are arranged in a descending order of the total required different types of resources. These VNs are mapped over PNs one-by-one in a descending order. A VN can be mapped to a PN on which none of the VNs from the given cloud demand is yet mapped, and the PN must contain at least the required number of different types of resource requested by the VN. Among these PNs, a PN is selected that has the maximum ratio of the number of available resources to the total number of resources for the maximum number of different types of resources. If at least one of the VNs cannot be mapped, then the procedure blocks the cloud demand.

After mapping VNs, the procedure maps virtual links (VLs) over physical links (PLs) while performing load balancing over network resources. For each VL (i, j), the procedure first estimates the required amount of spectral resources $f_{ij}$, which is defined as the product of the shortest distance in terms of hops $d_{ij}$ between PNs over which i and j VNs are mapped, and minimum required spectrum $A_{ij}$, $A_{ij}$ is determine from the highest spectral efficient modulation format that can reach at least $h_{ij}$ distance, where $h_{ij}$ is the physical (Euclidean) distance in terms of Km between VNs i and j. The procedure arranges VLs in a descending order of the estimated required spectrum, and maps these VLs in a one-by-one manner as follows.

The procedure determines a set of feasible modulation formats $M_{ij}^k$ for each of the k-shortest routes connecting PNs on which VNs i and j are mapped based on their reachability requirements. In the next step, the procedure determines the probability $P_{ij}^{km}$ of mapping the VL (i, j) over a physical route k using a modulation format m is determined. To determine this probability, the procedure first finds a bit-map of each of the k-shortest routes connecting PNs on which VNs i and j are mapped. A bit-map of a route is determined by performing bit-wise logical end operations on the bit-maps of all physical links along the route. Afterwards, the procedure determines the required spectrum $S_{ij}^{km}$=ceiling $(l_{ij}/Z_m)$ to support the line rate $l_{ij}$ over route k using modulation format m. In the next step, the procedure finds the number of wavelength slots starting from which at least [ceiling($S_{ij}^{km}$/q)] number of consecutive slots is available in the bit-map of a route k. The ratio of the found number of wavelength slots to [floor(T/q)–ceiling($S_{ij}^{km}$/q)+1] represents the probability $P_{ij}^{km}$, where [floor(T/q)–ceiling($S_{ij}^{km}$/q)+1] represents the total number of potential wavelength slots starting from which at least [ceiling($S_{ij}^{km}$/q)] number of consecutive wavelength slots available. In the next step, the procedure selects a route k and modulation format m that maximizes the probability $P_{ij}^{km}$. if $P_{ij}^{km}$=0, then the procedure blocks the connection and releases pre-allocated node and link resources, otherwise the procedure finds the lowest wavelength slots at which [ceiling($S_{ij}^{km}$/q)] number of consecutive wavelength slots are available for the selected k and m, and provisions the VL at the found wavelength slots on the selected route k for the modulation format m. Finally the procedure checks whether all VLs are provisioned or not. If at least one of the VLs is not yet provisioned, then the procedure repeats the procedure of VL mapping, otherwise the procedure is terminated.

Figure 2:
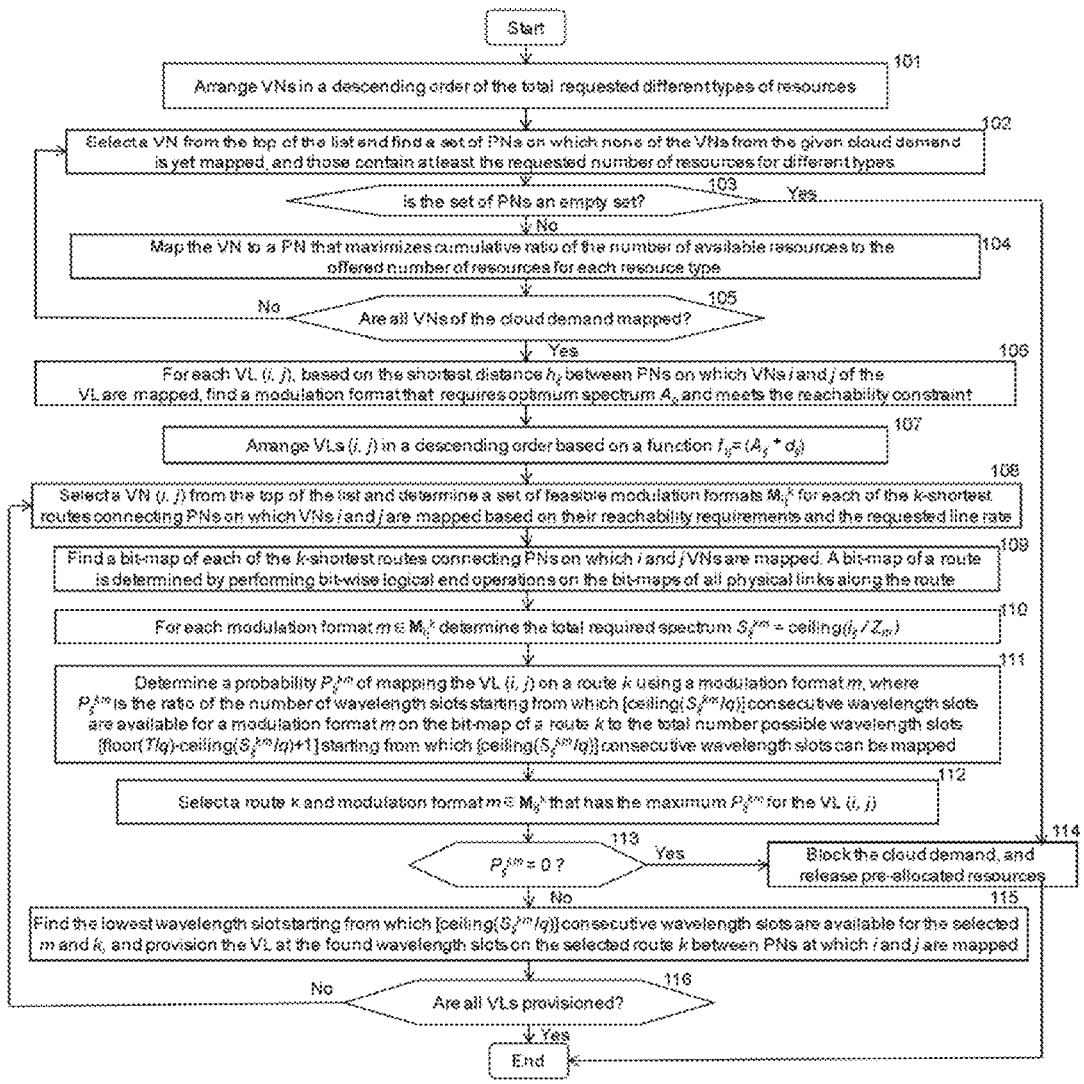
FIG. 2 is a block detailing the compute followed by network load balancing, in a accordance with the invention.

The detail procedure is described in terms of the flow chart as shown in FIG. 2.

101: The procedure arranges VNs of the given cloud request in a descending order of the total requested different types of resources.

102: The procedure finds a set of PNs on which none of the VNs of the given cloud demand is yet mapped, and these nodes contains at least the requested number of resources of different types by the VN

103. The procedure checks whether the set of PNs is empty or not. If the set is empty, then the procedure follows Step 114. If the set if not empty, then the procedure follows Step 104.

104: The procedure maps the VN to a PN that maximizes cumulative ratio of the number of available resources to the offered number of resources for each resource type.

105: The procedure checks whether all VNs of the given cloud demand are mapped. If at least one of the VNs is not yet mapped, then the procedure follows Step 102, otherwise the procedure follows Step 106.

106: For each VL (i, j), based on the shortest distance $h_{ij}$ between PNs on which VNs i and j of the VL are mapped, the procedure finds a modulation format that requires optimum spectrum $A_o$ and meets the reachability constraint.

107: The procedure arranges VLs of the cloud request in a descending order according to function $f_{ij}=(A_{ij}*d_{ij})$.

108: The procedure selects a VN (i, j) from the top of the list, and determines a set of feasible modulation formats $M_{ij}^k$ for each of the k-shortest routes connecting PNs on which VNs i and j are mapped based on their reachability requirements and the requested line rate.

109: The procedure finds a bit-map of each of the k-shortest routes connecting PNs on which i and j VNs are mapped. A bit-map of a route is determined by performing bit-wise logical end operations on the bit-maps of all physical links along the route.

110: For each modulation format m∈$M_{ij}^k$, the procedure determines the total required spectrum $S_{ij}^{km}$=ceiling($l_{ij}/Z_m$).

111: The procedure determines a probability $P_{ij}^{km}$ of mapping the VL (i, j) on a route k using a modulation format m, where $P_{ij}^{km}$ is the ratio of the number of wavelength slots starting from which [ceiling($S_{ij}^{km}$/q)] consecutive wavelength slots are available for a modulation format m on the bit-map of a route k to the total number possible wavelength slots [floor(T/q)–ceiling($S_{ij}^{km}$/q)+1] starting from which [ceiling($S_{ij}^{km}$/q)] consecutive wave length slots can be mapped.

112: The procedure selects a route k and modulation format m∈$M_{ij}^k$ that has the maximum $P_{ij}^{km}$ for the VL (i, j).

113: The procedure checks whether the maximum probability $P_{ij}^{km}$ is 0 or not. If it is 0, then the procedure follows Step 114, otherwise the procedure follows Step 115.

114: The procedure blocks the cloud demand after releasing the pre-allocated node and spectral resources.

115: The procedure finds the lowest wavelength slot starting from which [ceiling($S_{ij}^{km}$/q)] number of consecutive wavelength slots are available for the selected m and k, and provisions the VL at the found wavelength slots on the selected route k between PNs at which i and j are mapped.

116: The procedure checks whether all VNs are already mapped or not. If at least one of the VNs is not yet mapped, then the procedure follows Step 108, otherwise the procedure is terminated.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 3:
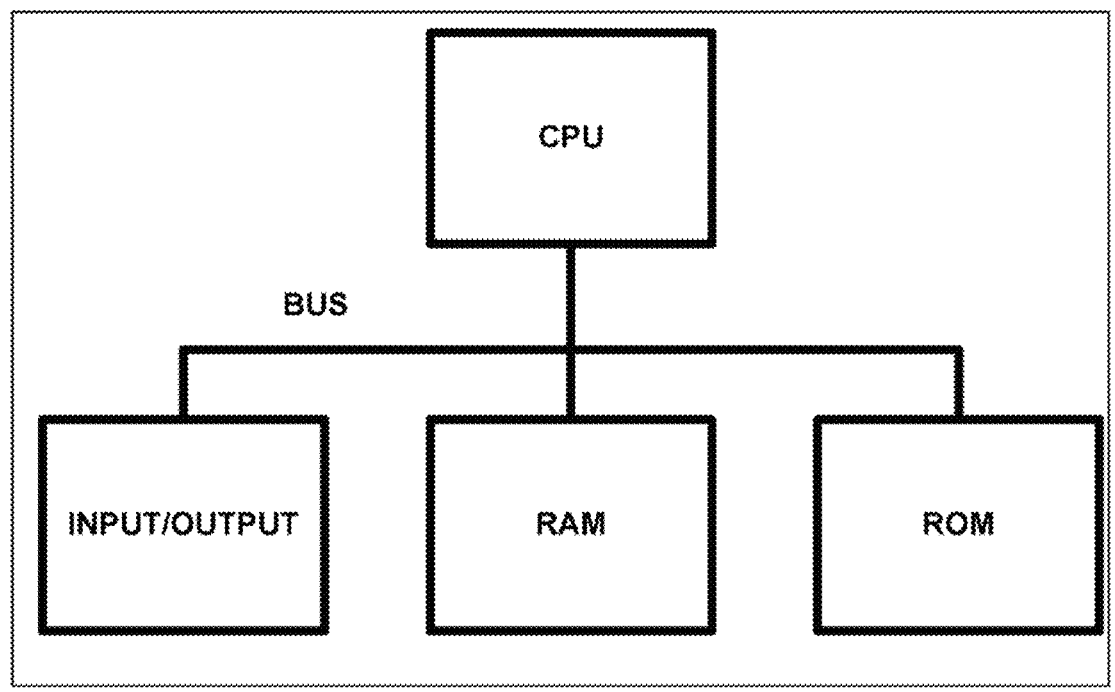
FIG. 3 shows an exemplary computer configuration for implementing the invention.

By way of example, a block diagram of a computer to support the system is discussed next in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing it can be appreciated that the key features of the invention enable quickly finding a solution for the cloud service embedding problem, that the invention is is applicable in the optical control plane, such as Path Computation Element (PCE) and as an application in a software-defined controller, and application of the invention can embed a reasonable and fair number of cloud demands in quickest time, and thus enhance software defined transport optical network performance.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising the steps of:
   implementing by a computer an embedding of cloud demands over a software defined flexible grid optical transport network, the implementing comprising:
   determining required resources for each node and arranging virtual nodes in the network in a descending order of a total number of required resources;
   mapping the virtual nodes over physical nodes while balancing a load for different types of resources;
   estimating spectral resources for each link and arranging virtual links in a descending order of estimated spectral resources;
   mapping virtual links over physical routes and selecting a modulation format for the virtual links while balancing the load over physical links;
   assigning wavelength and spectrum to the virtual links; and
   selecting a virtual node VN from the top of a list, determining a set of feasible modulation formats for each of a k-shortest routes connecting physical nodes PNs on which virtual nodes VNs are mapped based on their reachability requirements and the requested line rate;
   finding a bit-map of each of the k-shortest routes connecting PNs on which VNs are mapped, a bit-map of a route being determined by performing bit-wise logical end operations on the bit-maps of all physical links along the route, for each modulation format;
   determining the total required spectrum, determining a probability of mapping the VL on a route using a modulation format based on a ratio of the number of wavelength slots starting from which consecutive wavelength slots are available for a modulation format on the bit-map of a route k to the total number possible wavelength slots starting from which consecutive wavelength slots can be mapped; and
   selecting a route and modulation format that has a maximum probability for the virtual link VL, and checking whether the maximum probability is 0 or not.

2. The method of claim 1, wherein the step of mapping virtual nodes over physical nodes while balancing a load for different types of resources comprises finding a set of physical nodes PNs on which none of the virtual nodes VNs of a given cloud demand is yet mapped, and these nodes contains at least a requested number of resources of different types by the virtual nodes VN.

3. The method of claim 1, wherein the step of mapping virtual nodes over physical nodes while balancing a load for different types of resources further comprises checking whether the set of physical nodes PNs is empty or not, if the set is empty, a blocking the cloud demand after releasing the pre-allocated node and spectral resources, and if the set if not empty, a mapping the virtual node VN to a physical node PN that maximizes cumulative ratio of the number of available resources to the offered number of resources for each resource type.

4. The method of claim 1, wherein the step of mapping virtual nodes over physical nodes while balancing a load for different types of resources further comprises checking whether all virtual nodes VNs of the given cloud demand are mapped, if at least one of the VNs is not yet mapped, then there is a finding of a set of physical nodes PNs on which none of the virtual nodes VNs of the given cloud demand is yet mapped, and these nodes contain at least the requested number of resources of different types by the virtual node VN, otherwise, for each virtual link VL based on the shortest distance between physical nodes PNs on which virtual nodes VNs of the virtual link VL are mapped, there is a finding of a modulation format that requires an optimum spectrum and meeting a reachability constraint.

5. The method of claim 1, wherein the step of arranging virtual links in a descending order of estimated spectral resources comprises for each virtual link VL, based on a shortest distance between physical nodes PNs on which virtual nodes VNs of the virtual link VL are mapped, then finding a modulation format that requires optimum spectrum and meet a reachability constraint, and arranging virtual links VLs of a cloud request in a descending order.

6. A system comprising:
   implementation by a computer an embedding of cloud demands over a software defined flexible grid optical transport network, the implementing comprising:
   arranging virtual nodes in the network in a descending order of a total number of required resources;
   mapping the virtual nodes over physical nodes while balancing a load for different types of resources;
   arranging virtual links in a descending order of estimated spectral resources;
   mapping virtual links over physical routes and selecting a modulation format for the virtual links while balancing the load over physical links;
   assigning wavelength and spectrum to the virtual links; and
   selecting a virtual node VN from the top of a list, determining a set of feasible modulation formats for each of a k-shortest routes connecting physical nodes PNs on which virtual nodes VNs are mapped based on their reachability requirements and the requested line rate;
   finding a bit-map of each of the k-shortest routes connecting PNs on which VNs are mapped, a bit-map of a route being determined by performing bit-wise logical end operations on the bit-maps of all physical links along the route, for each modulation format;

determining the total required spectrum, determining a probability of mapping the VL on a route using a modulation format based on a ratio of the number of wavelength slots starting from which consecutive wavelength slots are available for a modulation format on the bit-map of a route k to the total number possible wavelength slots starting from which consecutive wavelength slots can be mapped; and selecting a route and modulation format that has a maximum probability for the virtual link VL, and checking whether the maximum probability is 0 or not.

7. The system of claim 6, wherein the step of mapping virtual nodes over physical nodes while balancing a load for different types of resources further comprises checking whether the set of physical nodes PNs is empty or not, if the set is empty, blocking the cloud demand after releasing the pre-allocated node and spectral resources, and if the set if not empty, mapping the virtual node VN to a physical node PN that maximizes cumulative ratio of the number of available resources to the offered number of resources for each resource type.

8. The system of claim 6, wherein the step of mapping virtual nodes over physical nodes while balancing a load for different types of resources further comprises checking whether all virtual nodes VNs of the given cloud demand are mapped, if at least one of the VNs is not yet mapped, then there is a finding of a set of physical nodes PNs on which none of the virtual nodes VNs of the given cloud demand is yet mapped, and these nodes contain at least the requested number of resources of different types by the virtual node VN, otherwise, for each virtual link VL based on the shortest distance between physical nodes PNs on which virtual nodes VNs of the virtual link VL are mapped, there is a finding of a modulation format that requires an optimum spectrum and meeting a reachability constraint.

9. The system of claim 6, wherein the step of arranging virtual links in a descending order of estimated spectral resources comprises for each virtual link VL, based on a shortest distance between physical nodes PNs on which virtual nodes VNs of the virtual link VL are mapped, then finding a modulation format that requires optimum spectrum and meet a reachability constraint, and arranging virtual links VLs of a cloud request in a descending order.

* * * * *